United States Patent
Peretz et al.

(10) Patent No.: US 12,260,044 B2
(45) Date of Patent: Mar. 25, 2025

(54) UPLINK CHANNEL COMPENSATION FOR TOUCHSCREEN DEVICES

(71) Applicant: Microsoft Technology Licensing, LLC, Redmond, WA (US)

(72) Inventors: Ahia Peretz, Ramat Gan (IL); On Haran, Herzliya (IL); Adam Benjamin Meshi, Tel-Aviv (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/628,650

(22) Filed: Apr. 5, 2024

(65) Prior Publication Data

US 2024/0302919 A1    Sep. 12, 2024

Related U.S. Application Data (63) Continuation of application No. 17/905,409, filed as application No. PCT/US2021/018272 on Feb. 17, 2021, now Pat. No. 11,977,702.

(30) Foreign Application Priority Data

Mar. 25, 2020 (EP) .................................. 20165602

(51) Int. Cl.
    *G06F 3/041*      (2006.01)
    *G06F 3/0354*     (2013.01)
    *G06F 3/044*      (2006.01)

(52) U.S. Cl.
    CPC ...... *G06F 3/04166* (2019.05); *G06F 3/03545* (2013.01); *G06F 3/044* (2013.01)

(58) Field of Classification Search
CPC ... G06F 3/03545; G06F 3/04166; G06F 3/044
See application file for complete search history.

(56) References Cited

U.S. PATENT DOCUMENTS

| | | | |
|---|---|---|---|
| 10,241,597 B2* | 3/2019 | Jung | G06F 3/038 |
| 10,488,982 B2* | 11/2019 | Gur | G06F 3/0442 |
| 2012/0105362 A1* | 5/2012 | Kremin | G06F 3/0446 345/174 |
| 2017/0177145 A1* | 6/2017 | Hara | G06F 3/04162 |
| 2017/0285771 A1* | 10/2017 | Jung | G06F 3/0383 |
| 2018/0239445 A1* | 8/2018 | Barel | G06F 3/04162 |
| 2018/0356908 A1* | 12/2018 | Koike | G06F 3/041 |
| 2019/0146602 A1* | 5/2019 | Kadowaki | G06F 3/0383 345/174 |
| 2019/0159129 A1* | 5/2019 | Choi | H04B 1/40 |
| 2019/0171320 A1* | 6/2019 | Kim | G06F 3/04184 |
| 2019/0278388 A1* | 9/2019 | Barel | G06F 3/0412 |

OTHER PUBLICATIONS

Communication pursuant to Article 94(3) EPC Received for European Application No. 21709310.3, mailed on Jun. 25, 2024, 06 pages.

\* cited by examiner

*Primary Examiner* — Michael Pervan
(74) *Attorney, Agent, or Firm* — Barta Jones, PLLC (57) ABSTRACT

An apparatus and method for compensating the effect of a contact by a hand or other body part of a user with a touch screen while holding an input device on the strength of a capacitively coupled uplink signal provided to the input device by a host device, by detecting and/or discriminating the body touch and modifying at least one uplink channel parameter.

20 Claims, 4 Drawing Sheets

UPLINK CHANNEL COMPENSATION FOR TOUCHSCREEN DEVICES

BACKGROUND

Electronic devices, especially tablets or smart phones, may accept input via hand-held peripheral input devices, such as a pen or stylus, and may then act as host devices to the input devices. The input device may be held manually by a user in relation to a touch screen to provide input to the electronic device. Positions of the input device over the touch screen are correlated with virtual information portrayed on the touch screen. A touch position of the input device can be detected due to a small change in capacitance at a contact point on the touch screen.

SUMMARY

This Summary is provided to introduce a selection of concepts in simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

According to an aspect, the disclosure in some embodiments relates to an apparatus for controlling an inking process by an input device on a touch screen, the apparatus comprising:
  a body touch detector for detecting a body touch by a body portion of a user on the touch screen during a concurrent touch by the input device; and
  a modulator for temporarily changing at least one transmission parameter of an uplink channel from a touch screen driver of the touch screen to a receiver of the input device in response to a detected body touch.

According to another aspect, a host device or digitizer comprises the above apparatus of the first aspect.

According to a further aspect, the disclosure in some embodiments relates an apparatus for controlling an inking process by an input device on a touch screen, the apparatus comprising:
  a communication unit for receiving a body touch feedback signal from a host device of the touch screen; and
  a sensitivity controller for controlling the sensitivity of a receiver for receiving an uplink signal from a touch screen driver of the touch screen, in response to a receipt of the body touch feedback signal.

According to still further aspect, an input device comprises the above apparatus of the further aspect.

According to a still further aspect, a method of controlling an inking process by an input device on a touch screen comprises:
  detecting a body touch by a body portion of a user on the touch screen during a concurrent touch by the input device; and
  temporarily changing at least one transmission parameter of an uplink channel from a touch screen driver of the touch screen to a receiver of the input device in response to a detected body touch.

According to a still further aspect, a method of controlling an inking process by an input device on a touch screen comprises:
  receiving a body touch feedback signal from a host device of the touch screen; and
  controlling a sensitivity of a receiver for receiving an uplink signal from a touch screen driver of the touch screen, in response to a receipt of the body touch feedback signal.

Unless otherwise defined, all technical and/or scientific terms used herein have the same meaning as commonly understood by one of ordinary skill in the art. Although methods and materials similar or equivalent to those described herein can be used in practice or testing of embodiments of the disclosure, example methods and/or materials are described below. In addition, the materials, methods, and examples are illustrative only and are not intended to be necessarily limiting.

BRIEF DESCRIPTION OF THE DRAWINGS

To assist understanding of the present disclosure and to show how embodiments of such may be put into effect, reference is made, by way of example only, to the accompanying drawings in which.

DETAILED DESCRIPTION OF EMBODIMENTS

The present disclosure is directed to an adaptive uplink channel compensation for a touch-sensitive display system.

Figure 1:
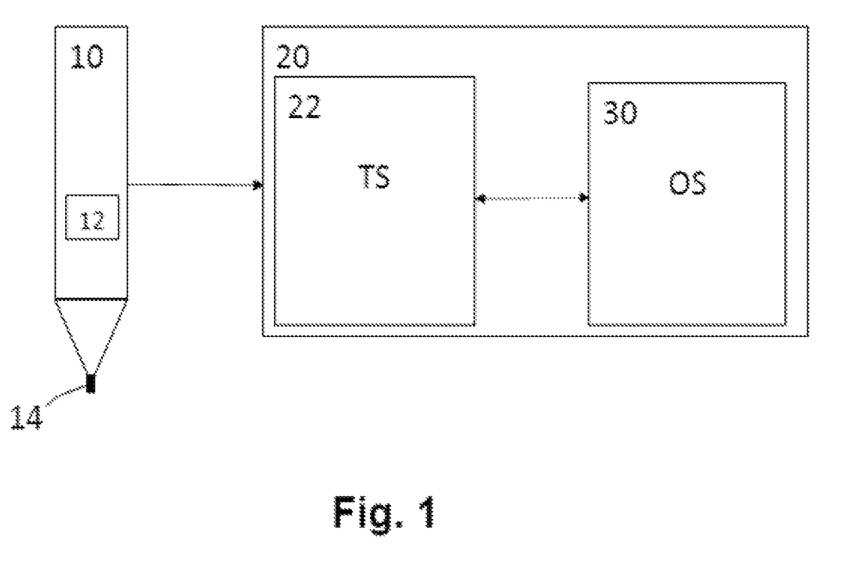
FIG. 1 is a schematic block diagram of an example system comprising a stylus and a host device.

FIG. 1 is a schematic illustration of an example system comprising a host device 20 (e.g. an electronic device with a touch-sensitive display device, including a smart phone, a tablet, a watch, a desktop computer, a gaming device, a wearable device, a television, a video conferencing system, etc.) and a hand-held stylus peripheral ("stylus") 10 with an input/output unit 12 for receiving an uplink signal received from the host device 20. Furthermore, the stylus 10 may comprise a pressure sensor (not shown) configured to sense a pressure or force applied to a tip electrode 14 of the stylus 10. The stylus may be capable of transmitting output data (e.g. measured pressure or force data) of the pressure sensor to the host device 20 via a downlink signal. The host device 20 comprises a touch screen (TS) 22 (touch-sensitive display) and an operating system (OS) 30 for controlling the touch screen 22.

The stylus 10 is used to communicate user input to the host device 20. The touch screen 22 may include a built-in digitizer to sense signals transmitted from the stylus 10. A user interacts with the digitizer by positioning and moving the tip electrode 14 of the stylus 10 over a sensing surface of the touch screen 22. The position of the tip electrode 14 of the stylus 10 with respect to the sensing surface is tracked by the digitizer and interpreted as a user command. In some technologies, the position of the stylus 10 can be determined based on detection of capacitive coupling between the tip electrode 14 of the stylus and one or more electrodes of the digitizer. For example, the touch screen 22 may include a digitizer with a plurality of X and Y oriented conductors or a resistive film to receive downlink signals transmitted from the tip electrode 14 of the stylus 10. To accurately identify the tip position, the transmitting electrode is, in some technologies, physically positioned within the writing tip electrode 14 of the stylus 10.

The stylus 10 can be classified as a passive stylus or an active stylus. A passive stylus utilizes sensing methods based on changes in the capacitive coupling between sensor electrodes deposited on a touch-screen sensor and an input object, such as a rubber-tipped stylus. In contrast, an active stylus drives unique modulated downlink signals between the tip electrode 14 of the stylus 10 and a grid or matrix of electrodes of a touch-screen sensor of the digitizer and utilizes sensing methods based on changes in the capacitive coupling between sensor electrodes. The digitizer detects at least one position of the stylus 10 based on the downlink signal emitted and the detected position provides input to the host device 20 associated with the digitizer. The detected position may then be interpreted as user commands. Often, the digitizer may be integrated with touch screen 22, e.g., to form a touch-sensitive display device.

Furthermore, the stylus 10 may communicate detected pressure information to the host device 20 for digital ink weighting. One of the features of digital ink is force/pressure sensitivity which allows line thickness control by the user of the stylus 10.

If the stylus 10 is an active stylus it may generate a modulated downlink signal that may be detectable by the digitizer. The signal may be encoded with information such as the device identification, operational mode (e.g., writing, erasing), pressure/force information, tilt information, and other information. The information may be allocated to various portions of the signal.

If the stylus 10 is a passive stylus, it may utilize sensing methods based on changes in the capacitive coupling between sensor electrodes deposited on a touch-screen sensor and an input object, such as a rubber-tipped stylus. In such implementations, the stylus 10 may communicate detected pressure/force information to the host device 20 using communication protocols such as Wi-Fi, Bluetooth, etc.

The information (e.g., pressure/force information) transmitted by the stylus 10 is detected by the host device 20 and used to provide functionality in the display of the host device 20. For example, the host device 20 may detect that the stylus 10 is in a writing mode with identifiable pressure/force information. The host device 20 can use that information (in combination with position information detected through the digitizer) to display digital ink with a thickness or color dependent on the pressure/force information encoded in the signal. For example, a light touch may indicate a relatively finer or lighter line should be draw on the display of the touch screen 22. As the user increases pressure/force on the stylus 10, the weight (e.g. darkness or thickness) of the line may increase accordingly.

Thus, downlink transmission of information is achieved by electrostatic communication from the stylus 10 to the digitizer of the host device 20, wherein the digitizer is configured to extract the position of the stylus based on the downlink signal and the stylus 10 may modulate data on the downlink signal to transmit a pen identity, a force applied on its tip electrode 14, pressure levels, a button indication, etc.

Additionally, uplink transmission of information is achieved via a communication link from the digitizer of the host device 20 to the stylus 10. The uplink transmission link can be used by the stylus 10 to acquire e.g. digitizer timing and cycle length to be able to ink on the display of the host device 20 and/or receive data from the digitizer, e.g., which frequency shall be used to transmit the downlink signal.

As an example, a touch screen driving signal may be applied to the touch screen 22. The touch screen driving signal may include an uplink signal for synchronization with the stylus 10 and a touch sensor driving signal for sensing a touch input applied to the touch screen 22. When the stylus 10 is brought into contact with the touch screen 22, the stylus 10 receives the uplink signal from the touch screen 22, generates a downlink signal (i.e. pen driving signal) in synchronization with the touch sensor driving signal on the basis of the uplink signal and outputs the generated downlink signal to the touch screen 22 e.g. through the tip electrode 14. Since the downlink signal is synchronized with the touch sensor driving signal, it serves to increase sensitivity of the touch sensor driving signal.

However, in a case a palm or other body portion of a user touches the touch screen 22 together with the stylus 10, a problem arises in that the stylus 10 might fail to properly receive the uplink signal. Here, the palm may be either a palm of a hand gripping the stylus 10 or a hand without the stylus 10. In this case, the stylus 10 may fail to be synchronized with the touch screen 22 so that no proper operation can be achieved.

Figure 2:
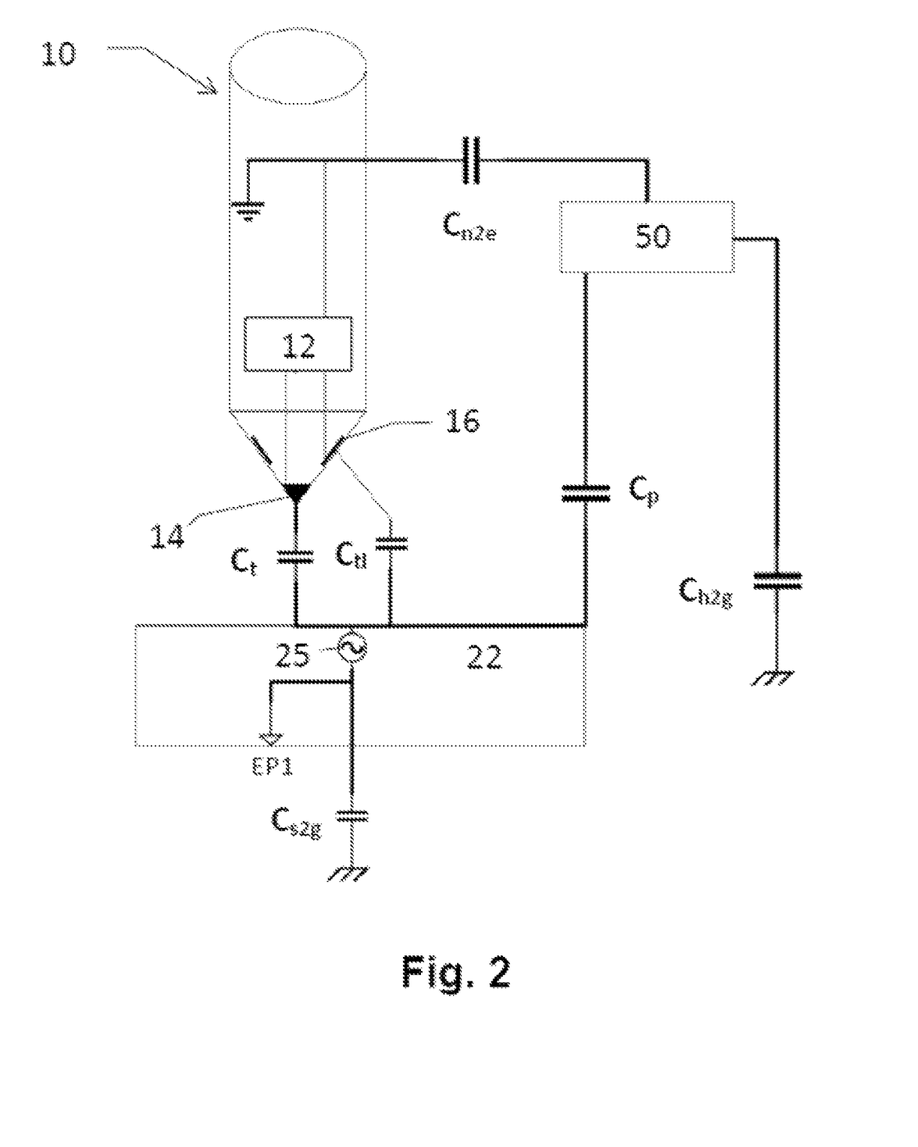
FIG. 2 is schematic block diagram indicating capacitances that influence the strength of an uplink signal during a body touch on a touch screen.

FIG. 2 is schematic block diagram indicating capacitances that influence the strength of an uplink signal during a body touch on a touch screen.

As initially mentioned, a body touch on the touch screen 22 of the host device e.g. by the hand 50 of a user may reduce the strength of the uplink signal received at an input/output unit 12 of a tip receiver via the tip electrode 14 and a tip capacitance Ct of the stylus 10. The uplink signal is generated at a touch screen driver 25 of the touch screen 22. Especially, when the host device (e.g. a personal computer) is in a battery mode or connected to the grid via a 2-prong plug without a connector to earth potential EP1, the ground of the touch screen 22 and its digitizer in an in-cell configuration is only coupled to the earth through a system-to-ground capacitance Cs2g. The hand 50 of a user of the stylus is coupled to the touch screen 22 through a palm capacitance Cp and to earth trough a hand-to-ground capacitance Ch2g. Additionally, the stylus ground (i.e. enclosure) is coupled to the hand 50 of the user via a hand-to-enclosure capacitance Ch2e while holding the stylus 10.

In an in-cell configuration, touch sensing elements of the digitizer are directly integrated into one or more layers of the display stack of the touch screen 22 itself. Thereby, the touch sensor substrate can be removed by combining display cells of the touch screen display and the touch sensing elements into a single structure, allowing touch screen devices to become thinner and lighter. Former designs with a separate sensor layer are known as out-cell configuration.

Thus, when the user touches the touch screen 22 via his/her hand 50, some of the uplink signal is coupled via the human body of the user to the pen ground, which reduces the uplink signal that enters the tip electrode 14 of the stylus 10.

In the following, an example of a calculation of the dependence of the uplink signal at the tip electrode 14 of the stylus 10 from the parasitic capacitances indicated in FIG. 2 is explained in more detail.

The hand potential Vh at the hand 50 of the user with reference to ground potential Vul of the touch screen 22 can be expressed as follows:

$$V_h = \sim V_{ul} * C_p / (C_{s2g} + C_p) \qquad (1)$$

Using the above equation (1), the current $I_t$ of the uplink signal at the tip electrode 14 can then be expressed as follows:

$$I_t = \sim (V_{ul} - V_h) \, C_t \, s \qquad (2)$$

$$I_t = \sim V_{ul} (1 - C_p / (C_{s2g} + C_p)) \, C_t \, s \qquad (3)$$

wherein s denotes the complex frequency.

For a typical case where $C_p=10$ pF and $C_{s2g}=5$ pF, an attenuation of the uplink signal by a factor of 0.33 (or −10 dB) is thus obtained.

To mitigate the problem of reduced uplink signal due to a body touch, an uplink channel compensation approach is suggested in embodiments, by which the at least one parameter (e.g. channel amplification, spatial distribution, channel sensitivity etc.) of the uplink channel from the touch screen driver 25 to the stylus 10 is temporarily modified to compensate for the signal reduction during a body touch at the touch screen 22.

Figure 3:
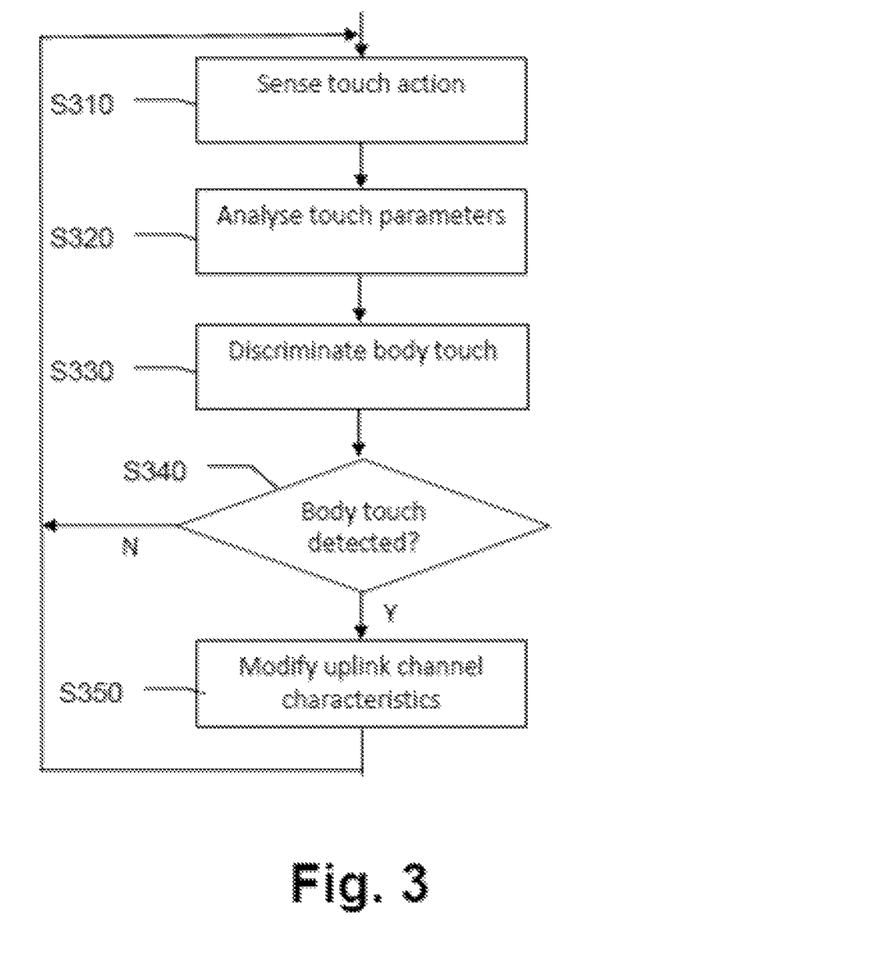
FIG. 3 is a schematic flow diagram of an uplink channel compensation procedure during a body touch.

FIG. 3 is a schematic flow diagram of an uplink channel compensation procedure during a body touch.

An initial sensing operation S310 detects parameters of a touch action at the touch screen 22. This can be achieved by analysing touch row data according to a touch sensor driving signal and the downlink signal of the stylus 10 to obtain touch parameters (e.g. capacitance, position, phase, amplitude, single-touch, multi-touch etc.).

More specifically, the touch screen 22 may be implemented as a capacitive touch screen sensing a touch input through a plurality of capacitance sensors, wherein capacitance may be classified as self-capacitance and mutual capacitance. The self-capacitance may be formed along a conductor line of a single layer formed in one direction. The mutual capacitance may be formed between two conductor lines perpendicular to each other. The touch sensor may be implemented by mutual capacitance sensors that may include transmission (Tx) electrode lines, reception (Rx) electrode lines intersecting with the Tx electrode lines, and touch sensors formed at intersections of the Tx electrode lines and the Rx electrode lines. The Tx electrode lines are driving signal lines supplying electric charges to the touch sensors by applying the touch sensor driving signal (and/or the downlink signal of the stylus 10) to the touch sensors. The Rx electrode lines are sensor lines connected to the touch sensors and supplying electric charges of the touch sensors to a touch driving device. In a mutual capacitance sensing method, electric charges are supplied to the touch sensor by applying the touch sensor driving signal (and/or the downlink signal) to the Tx electrodes through the Tx electrode lines, and a change in capacitance of the touch sensors is sensed through Rx electrodes and the Rx electrode lines in synchronization with the touch sensor driving signal (and/or the stylus downlink signal), whereby a touch input by a conductive object may be recognized.

Then, a touch analysis operation S320 is performed to analyse at least one touch parameter. In an example, the touch sensing system of the digitizer of the touch screen 22 may simultaneously sense two touch inputs, e.g., a body touch input by a body part (e.g. finger or palm) of a user and a stylus touch input by the stylus 10. The body touch input may be sensed on the basis of an analysis result of the touch row data according to the touch sensor driving signal, and the pen touch input may be sensed on the basis of an analysis result of touch row data according to the downlink signal of the stylus 10.

In a subsequent discrimination or detection operation S330, the analyzation result of the touch parameters is used to detect a body touch during a concurrent stylus touch by discriminating between a stylus touch and a body touch. As an example, the downlink signal of the stylus 10 and the touch sensor driving signal of the digitizer may have the same phase but the magnitude (e.g. pulse amplitude) of the downlink signal may be set to be greater than that of the touch sensor driving signal, whereby the touch row data of the position that the stylus 10 has touched and the touch row data of the position that the body of the user has touched are differentiated to easily distinguish between the stylus touch input and the body touch input (to thereby detect the concurrent body touch).

Then, in a subsequent decision operation S340, it is decided whether a body touch has occurred (i.e. has been detected) and a compensation is required to adjust the uplink signal. If no adjustment is required, the procedure jumps back to the sense operation S310 and starts again. Otherwise, if an adjustment is required (e.g. if a body touch has been detected), the procedure proceeds to a compensation operation S350 where at least one parameter (e.g. amplification, spatial distribution, sensitivity etc.) of the uplink channel is modified to compensate for the uplink signal loss or duction due to the detected body touch.

The operations of FIG. 3 may be continuously or intermittently repeated.

In the following, different examples of uplink channel compensations will be described.

Figure 4:
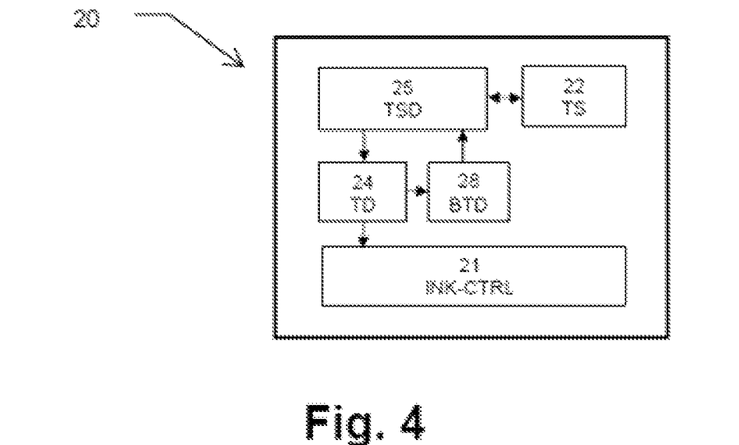
FIG. 4 is a schematic block diagram of an example system with uplink channel compensation at a host device.

FIG. 4 is a schematic block diagram of an example host device with uplink channel compensation.

Here, the adaptive uplink channel compensation can be achieved by modifying the spatial distribution of active touch sensor elements (antennas) of the digitizer of the touch screen 22. This can be achieved by locally disabling individual touch sensor elements at the determined location and/or area of the detected body touch to thereby reduce the body capacitance Cp to the uplink signal.

Normally, the uplink signal is transmitted from all sensor elements of the touch sensor on the touch screen 22 to improve the capacitance to the tip electrode 14 of the stylus 10 (e.g. when the stylus 10 hovers above the touch screen 22).

According to FIG. 4, the host device 20 comprises a touch screen 22 and a touch screen driver (TSD) 25 which controls a touch sensor (e.g. an array or matrix of sensor elements or antennas) of the touch screen 22. The touch screen driver 25 applies a touch screen driving signal to the sensor elements of the touch sensors and senses the amount of change in the charge of the sensor elements to determine a touch input. The touch screen driving signal includes the uplink signal and a touch sensor driving signal.

Furthermore, the touch screen driver 25 analyses charge variations of the touch sensor depending on the presence or absence of a touch input, determines or detects the touch input, and calculates coordinates of the touch input position.

The touch screen 22 may be configured as an in-cell liquid crystal display (LCD) panel that also includes a touchscreen functionality by positioning at least one of the touch layers (typically a transmit (TX) layer) under a color filter glass. Furthermore, typically the TX layer is shared with a common electrode (reference layer) of the touch screen 22. The touch screen driver 25 may be a capacitive touch screen driver that is used to measure the capacitance on the array of electrodes (sensor elements), such as an array including multiple transmit (TX) electrodes and multiple receive (RX) electrodes. An integrated circuit of the is typically the integrated circuit (IC) positioned on the substrate glass of the LCD which drives the timing and video signals to the LCD. While the above description is for in-cell LCD, similar stack-ups exist for other display types, such as active-matrix organic light-emitting diode (AMOLED).

Based on the sensor signals generated by the touch screen driver 25, a touch detector 24 detects touch parameters of touch actions as described above in connection with the sensing operation S310 of FIG. 3.

Additionally, the downlink signal received by the touch detector 24 from the touch screen driver 25 is forwarded to an ink control (INK-CTRL) application or unit (e.g. a drawing application or unit) 21, where it is utilized to generate digital ink at a determined location of the stylus 10 with a weight (e.g., thickness or darkness) or other ink parameter corresponding to a reported force, pressure or inking level included in the downlink signal.

The touch parameters determined by the touch detector 24 are provided to a body touch detector (BTD) 28 of the digitizer, which is configured to identify a location of a body portion (e.g. hand or finger) on the touch screen as described above in connection with the touch analysis and discrimination or detection operations S320 and S330 of FIG. 2. Based on the identified location of a detected body touch, the body touch detector 28 controls the touch screen driver 25 so that selected sensor elements of the touch sensor at or around the location the detected body touch are disabled to thereby reduce the amount of uplink signal loss via the partial uplink channel path through the capacitance Cp.

As an example, the body touch detector 28 of the digitizer may initiate a control operation by the touch screen driver 25 to disable the selected sensor elements by connecting them to ground potential or another reference potential to thereby reduce an excited uplink signal on the body portion of the user.

In another embodiment, the adaptive uplink channel compensation can be achieved by modifying the amplification of the uplink signal at the touch screen driver 25 of the touch screen 22. This can be achieved by controlling an amplification factor of an amplifier of the touch driver circuit 25. More specifically, based on a detected body touch, the body touch detector 28 controls the touch screen driver 25 of the digitizer so that the level of the uplink signal is increased to compensate any signal reduction caused by the body touch and ensure good inking performance. Normally, the digitizer may transmit the uplink signal with a low or moderate power or voltage. When, a body touch is indicted by the body touch detector 28, the touch screen driver 25 can be controlled by the body touch detector 28 to boost the voltage or power of the uplink signal momentarily or temporarily to improve the inking performance at the ink control unit or application 21.

It is noted that the spatial modification (e.g. selective disabling) of the selected sensor elements of the touch sensor may be combined with the modification of the amplification factor of the touch screen driver 25 to obtain a more effective compensation of the uplink signal reduction during a body touch.

The touch detector 24, the touch screen driver 25, the body touch detector 28, the ink control unit or application 21 and other system components of the host device 20 may be implemented in an application specific integrated circuit (ASIC), a system on chip (SOC), a field programmable gate array (FPGA), a micro-processing unit, etc.

Figure 5:
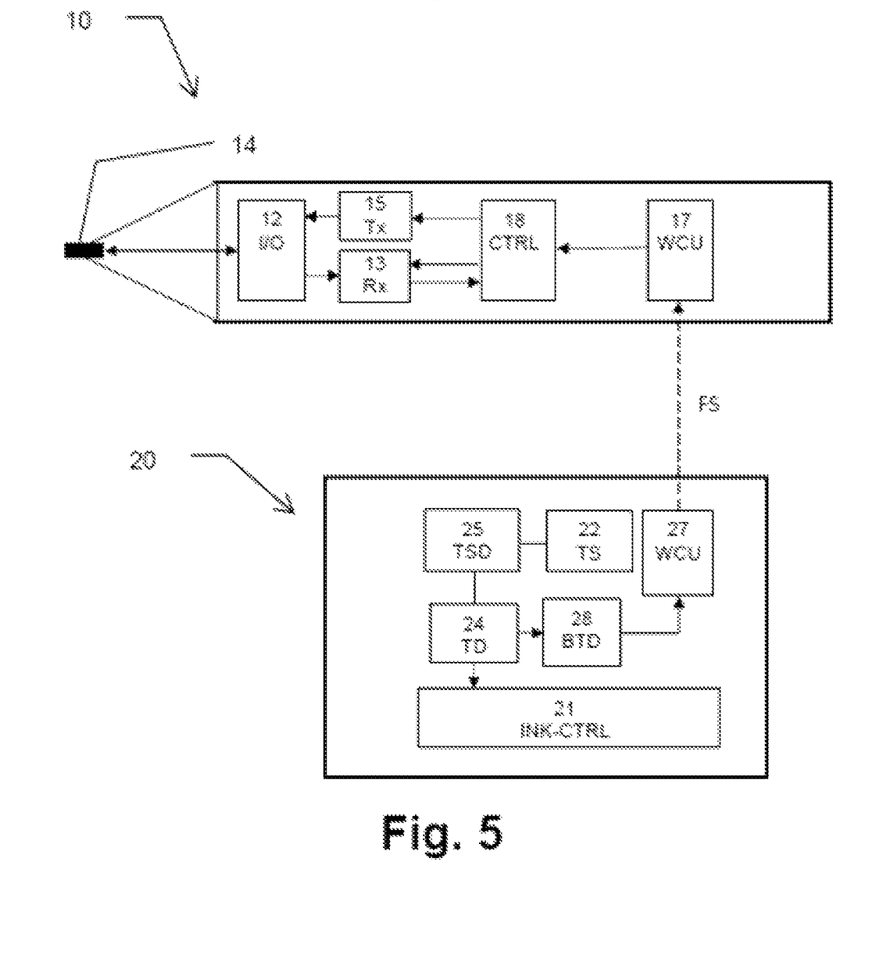
FIG. 5 is a schematic block diagram of an example host device with uplink channel compensation at an active stylus.

FIG. 5 is a schematic block diagram of an example host device 20 with uplink channel compensation at an active stylus 10. In this example, the uplink channel compensation is achieved by modifying the sensitivity of a reception unit (Rx) 13 of the stylus 10.

The tip electrode 14 of the stylus 10 may be formed of a conductive material such as a metal, or the like, and protrudes outwardly from one side of the housing to serve as an input/output electrode. Since the tip electrode 14 serves as an input/output electrode, a structure of the stylus 10 is advantageously simplified. When the tip electrode 14 touches the touch screen 22 of the host device 20, the tip electrode 14 is coupled to the touch screen 22 in the contact point. The tip electrode 14 receives a touch screen driving signal (uplink signal) from the touch screen 22 at the contact point and outputs a pen driving signal (downlink signal) produced within the stylus 10 to the contact point of the touch screen 22. When the tip electrode 14 touches the touch screen 22 of the host device 20, the input/output unit 12 of the stylus 10 electrically connects the tip electrode 14 and a reception unit 13 during a reception period, and electrically connects the tip electrode 14 and a transmission unit (Tx) 15 during a transmission period to thereby temporally separate a reception timing of the uplink signal (touch screen driving signal) and a transmission timing of the downlink signal (pen driving signal).

The reception unit 13 comprises at least one amplifier and at least one comparator and digitally processes the uplink signal input through the input/output unit 12 during the reception period.

The stylus 10 may further comprise one or more processing units (e.g. controller (CTRL)) 18 e.g. with a memory for onboard storage of user files, user specifications, etc. The memory may be a tangible processor-readable storage and may store processor readable instructions for communication and digital inking through the host device 20. The stylus 10 may comprise a display (not shown) that may display to the user any of the following: the power status of the battery, the current wireless signal strength, or other information relating to the host device 20 configured to receive user input from the stylus 10.

The processing unit 18 may analyse a pattern (i.e., pulse duty, number of pulses, and the like) of the uplink signal to check its validity. When a normal uplink signal is detected, the processing unit 18 determines that the uplink signal is valid and generates a pen driving signal (downlink signal) synchronized with a touch sensor driving signal included in the uplink signal. The processing unit 18 may refer to signal generation conditions (e.g. period, duty, number, and the like) of a default parameter set installed to generate the downlink signal synchronized with the touch sensor driving signal. The processing unit 18 then outputs the downlink signal to the tip electrode 14 through the input/output unit 12 during a transmission period of a touch period.

The stylus 10 may further comprise a wireless communication unit (WCU) 17. The wireless communication unit 170 may be configured to communicate with the host device 20 via Bluetooth, Wi-Fi, near-field communication (NFC), etc. The wireless communication unit 17 may include a receiver to receive communication commands, pairing requests, etc. from a wireless communication unit (WCU) 27 at the host device 20. The stylus 10 may further comprise a power supply (not shown), which may comprise a battery for powering the various components of the stylus 10. The battery may be rechargeable, replaceable, disposable, etc.

In some examples, the stylus 10 may additionally or alternatively be wired to the host device 20, for example, by a Universal Serial Bus (USB) connection and may communicate with the host device via such a connection.

Furthermore, the processing unit 18 may be configured to control the sensitivity of the reception unit 13 based on a feedback signal (FS) received from the host device 20 via the wireless communication unit 17. The sensitivity control may be achieved by temporarily applying a bias voltage to at least one amplifier of the reception unit 13 to control the receiver gain. Such gain control may be necessary to adjust the sensitivity of the reception unit 13 for a better reception of the uplink signal in case of a decreased uplink signal level due to a body touch.

Thus, in the present example, the adaptive uplink channel compensation can be achieved by modifying the sensitivity of the reception unit 13 at the stylus 10. More specifically, in response to a detected body touch, the body touch detector 28 forwards the feedback signal indicating a body touch event to a transmitter of the wireless communication unit 27 of the host device 20, which transmits the feedback signal to a receiver of the wireless communication unit 17 of the stylus 10. The wireless communication unit 17 of the stylus 10 forwards the received feedback signal to the processing unit 18 which generates a sensitivity control output to control the sensitivity of the reception unit 13 so that the level of the uplink signal is momentarily or temporarily increased to compensate for any signal reduction of the uplink signal caused by the body touch.

As a further example, the feedback signal may indicate different levels of sensitivity control output to provide an adaptive sensitivity control at the receiver 12 in dependence on the area and/or strength of the body touch and a resulting estimated reduction of the level of the uplink signal.

The stylus 10 may further comprise a force or pressure sensor (not shown) with an optional force or pressure response circuit (not shown), which together with the processing unit(s) 18 may collectively be referred to as the inking system. The inking system detects force or pressure applied to the tip electrode 14, optionally increases force or pressure sensitivity, converts the detected force or pressure to an output value (e.g. reported (inking) level) and communicates the output value to the host device 20.

As an example, the output value may be an encoded digitizer signal (i.e. the downlink signal) and transmitted to the digitizer of the host device 20. At the host device 20, the received output value is detected and forwarded to the ink control application or unit (e.g. a drawing application or unit) 21, where it is utilized to generate digital ink at a determined location of the stylus 10 with a weight (e.g., thickness or darkness) or other ink parameter corresponding to the adapted and reported force, pressure or inking level.

The input/output unit 12, the reception unit 13, the transmission unit 15, the processing unit(s) 18 and other system components of the stylus 10 may be implemented in an application specific integrated circuit (ASIC), system on chip (SOC), a field programmable gate array (FPGA), a micro-processing unit, etc.

The stylus 10 may include one or more buttons (not shown) for changing operational modes of the stylus. For example, when button is depressed a signal communicated to the host device may inform the host device that the stylus 10 is in an erasure mode. Furthermore, such operational modes may indicate a color of the digital ink, writing patterns (e.g., dotted lines), writing utensil (e.g., brush, pen, marker, pencil). The detected force or pressure may be indicated with different operational modes. For example, when in an erasure mode, the detected force or pressure may indicate an erasure thickness. The buttons may also be used to initiate a device pairing with the host device 20.

In examples, the stylus body may be formed of a material suitable for enclosing the components described herein. The stylus body may be formed from, for example without limitation, plastic, rubber, metal, carbon fiber, etc. and/or any combinations thereof.

It is noted that at least one of the above described spatial modification of the sensor elements of the touch sensor and the above described modification of the amplification factor of the driver at the host device 20 may be combined with the above described sensitivity control of the reception unit 13 at the stylus 10 to obtain a more effective compensation of the uplink signal reduction during a body touch.

To summarize, the effect of a contact by a hand or other body part of a user with a touch screen (while holding an input device (e.g. stylus or eraser or the like)) on the strength of a capacitively coupled uplink signal provided to the input device by a host device is mitigated by detecting and/or discriminating the body touch and modifying at least one uplink channel parameter to compensate the effect on the uplink signal. The channel compensation can be achieved by detecting a position of the body touch and using this detected position to selectively disable sensing elements of a touch sensor (modification of the spatial distribution of the uplink channel), so that the uplink signal is not supplied to touch screen sensing elements that are located in the area of the detected body touch. Alternatively or additionally, the channel compensation can be achieved by at least one of increasing an amplification of a touch screen driver to increase the level of the transmitted uplink signal (modification of the amplification of the uplink channel) or increasing the sensitivity of a receiver at the input device to increase the level of the received uplink signal.

It will be appreciated that the above embodiments have been described by way of example only. The invention can be applied to any type of touch screen system with any type of input device that may involve a body touch of a user. The touch screen 22 may be implemented on the basis of a liquid crystal display (LCD), a field emission display (FED), a plasma display panel (PDP), an organic light emitting display device, an electrophoresis display, and the like.

More generally, according to a first aspect disclosed herein, there is provided an apparatus for controlling an inking process by an input device on a touch screen, the apparatus comprising:
 a body touch detector for detecting a body touch by a body portion of a user on the touch screen during a concurrent touch by the input device; and
 a modulator for temporarily changing at least one transmission parameter of an uplink channel from a touch screen driver of the touch screen to a receiver of the input device in response to a detected body touch.

In embodiments, the modulator may be configured to modify the uplink channel by temporarily increasing an amplification factor of the touch screen driver in response to the detected body touch.

In embodiments, the modulator may be configured to determine a location of the body touch on the touch screen and to modify a spatial distribution of the uplink channel by disabling selected sensor elements of a touch sensor of the touch screen at the determined location of the body touch in response to the detected body touch.

In embodiments, the modulator may be adapted to disable the selected sensor elements by connecting them to a reference potential.

In embodiments, the modulator may be configured to modify the uplink channel by temporarily increasing a sensitivity of the receiver at the input device in response to the detected body touch.

In embodiments, the modulator may be adapted to increase the sensitivity of the receiver at the input device by signalling a body touch feedback signal from a host device of the touch screen to the input device.

In embodiments, the modulator may be configured to increase the sensitivity of the receiver by initiating a gain control of an amplifier of the receiver.

In embodiments, the apparatus of the first aspect may comprise a wireless communication unit for signalling the body touch feedback signal to the input device.

According to a second aspect disclosed herein, there is provided a host device or digitizer comprising an apparatus of the first aspect, a touch screen and a touch screen driver.

According to a third aspect disclosed herein, there is provided an apparatus for controlling an inking process by an input device on a touch screen, the apparatus comprising:
 a communication unit for receiving a body touch feedback signal from a host device of the touch screen; and
 a sensitivity controller for controlling the sensitivity of a receiver for receiving an uplink signal from a touch screen driver of the touch screen, in response to a receipt of the body touch feedback signal.

According to a fourth aspect disclosed herein, there is provided an input device comprising an apparatus of the third aspect and a receiver for receiving an uplink signal from a touch screen driver of a touch screen.

In embodiments, the input device may comprise a stylus or an eraser.

According to another aspect disclosed herein, there is provided a method of controlling an inking process by an input device on a touch screen, the apparatus comprising:
 detecting a body touch by a body portion of a user on the touch screen during a concurrent touch by the input device; and
 temporarily changing at least one transmission parameter of an uplink channel from a touch screen driver of the touch screen to a receiver of the input device in response to a detected body touch.

According to another aspect disclosed herein, there is provided a method of controlling an inking process by an input device on a touch screen, the apparatus comprising:
 receiving a body touch feedback signal from a host device of the touch screen; and
 controlling a sensitivity of a receiver for receiving an uplink signal from a touch screen driver of the touch screen, in response to a receipt of the body touch feedback signal According to another aspect disclosed herein, there is provided a computer program embodied on computer-readable storage and comprising code configured so as when run on one or more processors to perform the method of any embodiment disclosed herein.

Examples and embodiments described herein may be implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system used for implementation. Accordingly, logical operations making up examples or embodiments described herein may be referred to variously as operations, steps, objects, or modules. Furthermore, it should be understood that logical operations may be performed in any order, adding and omitting as desired, unless explicitly claimed otherwise or a specific order is inherently necessitated by the claim language.

Other variants and applications of the disclosed techniques may become apparent to a person skilled in the art once given the present disclosure. The scope of the present disclosure is not limited by the above-described embodiments but only by the accompanying claims.

The invention claimed is:

1. An apparatus comprising:
 a touch screen driver for controlling a touch screen; and
 a body touch detector for detecting a body touch by a body portion of a user on the touch screen during a concurrent touch by an input device,
 wherein the body touch detector is configured to change a transmission parameter of an uplink channel from the touch screen driver to a receiver of the input device by modifying a spatial distribution of sensor elements of the touch screen based at least upon the detected body touch.

2. The apparatus of claim 1, wherein the body touch detector is configured to modify the spatial distribution of the sensor elements of the touch screen by disabling at least one of the sensor elements.

3. The apparatus of claim 1, wherein the body touch detector is configured to modify the spatial distribution of the sensor elements of the touch screen by disabling at least one of the sensor elements by connecting the at least one sensor element to at least one of a ground potential or another reference potential.

4. The apparatus of claim 1, wherein the body touch detector is configured to modify the spatial distribution of the sensor elements of the touch screen by disabling at least one of the sensor elements at or around a location of the detected body touch on the touch screen.

5. The apparatus of claim 1, wherein the body touch detector is configured to determine a location of the detected body touch on the touch screen.

6. The apparatus of claim 1, wherein the body touch detector is configured to control the touch screen driver to modify the spatial distribution of sensor elements of the touch screen based at least upon the detected body touch.

7. The apparatus of claim 1, wherein the apparatus comprises a wireless communication unit for signaling a body touch feedback signal to the input device.

8. The apparatus of claim 1, further comprising the touch screen.

9. The apparatus of claim 1, wherein the input device comprises at least one of a stylus or an eraser.

10. An apparatus comprising:
 a body touch detector for detecting a body touch by a body portion of a user on a touch screen during a concurrent touch by an input device; and
 a modulator for changing a transmission parameter of an uplink channel from a touch screen driver of the touch screen to a receiver of the input device based at least upon the detected body touch,
 wherein the modulator is configured to change the transmission parameter by modifying a spatial distribution of the uplink channel based at least upon the detected body touch.

11. The apparatus of claim 10, wherein the modulator is configured to modify the spatial distribution of the uplink channel by disabling at least one sensor element of the touch screen.

12. The apparatus of claim 10, wherein the modulator is configured to modify the spatial distribution of the uplink channel by disabling at least one sensor element of the touch screen by connecting the at least one sensor element to at least one of a ground potential or another reference potential.

13. The apparatus of claim 10, wherein the modulator is configured to modify the spatial distribution of the uplink channel by disabling at least one sensor element of the touch screen at or around a location of the detected body touch on the touch screen.

14. The apparatus of claim 10, wherein the modulator is configured to determine a location of the detected body touch on the touch screen.

15. The apparatus of claim 10, wherein the modulator is configured to control the touch screen driver to modify the spatial distribution of the uplink channel based at least upon the detected body touch.

16. A method comprising:
    detecting a body touch by a body portion of a user on a touch screen during a concurrent touch by an input device;
    determining a location of the detected body touch on the touch screen; and
    changing a transmission parameter of an uplink channel from a touch screen driver of the touch screen to a receiver of the input device by modifying a spatial distribution of sensor elements of the touch screen based at least upon the determined location of the detected body touch.

17. The method of claim 16, wherein modifying the spatial distribution of the sensor elements of the touch screen based at least upon the determined location of the detected body touch comprises disabling at least one of the sensor elements.

18. The method of claim 16, wherein modifying the spatial distribution of the sensor elements of the touch screen based at least upon the determined location of the detected body touch comprises disabling at least one of the sensor elements by connecting the at least one sensor element to at least one of a ground potential or another reference potential.

19. The method of claim 16, wherein modifying the spatial distribution of the sensor elements of the touch screen based at least upon the determined location of the detected body touch comprises disabling at least one of the sensor elements at or around the determined location of the detected body touch.

20. The method of claim 16, wherein changing the transmission parameter of the uplink channel comprises controlling the touch screen driver to modify the spatial distribution of the sensor elements of the touch screen.

* * * * *